United States Patent
Mantell et al.

(10) Patent No.: US 8,031,372 B2
(45) Date of Patent: Oct. 4, 2011

(54) SYSTEM AND METHOD FOR DISTRIBUTING IMAGE VALUES OF A COLOR SEPARATION

(75) Inventors: David Allen Mantell, Rochester, NY (US); Jeffrey J. Folkins, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 742 days.

(21) Appl. No.: 12/107,596

(22) Filed: Apr. 22, 2008

(65) Prior Publication Data
US 2009/0262370 A1    Oct. 22, 2009

(51) Int. Cl.
*H04N 1/405* (2006.01)
*H04N 1/60* (2006.01)
*H04N 1/46* (2006.01)

(52) U.S. Cl. ....... 358/3.03; 358/1.9; 358/515; 358/1.13; 358/505; 358/523; 345/604; 345/697

(58) Field of Classification Search ................. 358/3.03, 358/1.9, 515, 1.13, 505, 523; 345/604, 697
See application file for complete search history.

(56) References Cited

U.S. PATENT DOCUMENTS

| | | | |
|---|---|---|---|
| 5,933,539 A | 8/1999 | Metcalfe et al. | |
| 6,751,358 B1 | 6/2004 | Mantell et al. | |
| 6,897,988 B1 * | 5/2005 | Saito et al. | 358/515 |
| 7,095,530 B2 | 8/2006 | Mantell et al. | |
| 7,262,885 B2 | 8/2007 | Yao | |
| 2003/0214660 A1 * | 11/2003 | Plass et al. | 358/1.9 |
| 2008/0122861 A1 * | 5/2008 | Ramanath et al. | 345/604 |

* cited by examiner

*Primary Examiner* — Charlotte M Baker
*Assistant Examiner* — Justin Katzwhite
(74) *Attorney, Agent, or Firm* — Maginot, Moore & Beck LLP

(57) ABSTRACT

A method processes image data in a color separation to attenuate printing defects arising from misalignment of serially arranged printheads that eject ink for the color separation. The method includes processing image values of the color separation with a first rendering process that corresponds to one printhead in a plurality of serially arranged printheads for printing the color separation, processing the image values of the color separation with a second rendering process that differs from the first rendering process for at least one other printhead in the plurality of serially arranged printheads for printing the color separation, generating firing signals for the one printhead from the rendered image values generated by the first rendering process, and generating firing signals for the at least one other printhead from the rendered image values generated by the second rendering process.

13 Claims, 4 Drawing Sheets

SYSTEM AND METHOD FOR DISTRIBUTING IMAGE VALUES OF A COLOR SEPARATION

TECHNICAL FIELD

This disclosure relates generally to imaging devices that eject ink from inkjets onto an image substrate and, more particularly, to imaging devices that have multiple printheads from which ink is ejected to form a color separation on a single pass of an image receiving member.

BACKGROUND

Drop on demand inkjet technology for producing printed media has been employed in commercial products such as printers, plotters, and facsimile machines. Generally, an inkjet image is formed by selectively ejecting ink drops from a plurality of drop generators or inkjets, which are arranged in a printhead or a printhead assembly, onto an image substrate. For example, the printhead assembly and the image substrate are moved relative to one other and the inkjets are controlled to emit ink drops at appropriate times. The timing of the inkjet activation is performed by a printhead controller, which generates firing signals that activate the inkjets to eject ink. The image substrate may be an intermediate image member, such as a print drum or belt, from which the ink image is later transferred to a print medium, such as paper. The image substrate may also be a moving web of print medium or sheets of a print medium onto which the ink drops are directly ejected. The ink ejected from the inkjets may be liquid ink, such as aqueous, solvent, oil based, UV curable ink or the like, which is stored in containers installed in the printer. Alternatively, the ink may be loaded in a solid form that is delivered to a melting device, which heats the solid ink to its melting temperature to generate liquid ink that is supplied to a print head.

In some of these imaging devices, multiple printheads form an image as the image substrate passes the printheads only once. For example, a web of paper moving past a plurality of printheads receives the ink ejected from the printheads and then moves to a web heater and fixer for further treatment of the image. The multiple printheads may be arranged in a serial manner to provide an appropriate density of pixels per unit of linear measurement for a particular color. For example, two printheads may be arranged vertically in the direction of the web movement with each printhead having 300 inkjets per inch in each row of inkjets in the printhead. By offsetting the second printhead from the first printhead by a half-width of a single inkjet, the pair of printheads forms rows of printed pixels at a density of 600 dots per inch (dpi). In this arrangement, each printhead prints half of the pixels in each row of an image.

One issue affecting image quality in imaging devices having serially arranged printheads is misalignment of the printheads. Misalignment occurs when the two printheads are not precisely aligned either to provide the single inkjet offset between the printheads or in the direction of the web movement such that neighboring pixels from the two heads do not form a row of drops. In areas of an image that are comprised of pixels of the same color having approximately the same ink density, this misalignment can be detected by the human eye. In four color or CYMK systems, the imaging device may include a pair of serially aligned printheads for each color. Misalignments between printheads may be quite detectable by the human eye, especially in relatively uniform areas of the image. In previously known systems, various techniques have been developed to treat the image densities in a color separation to address such discrepancies, however, such systems have not necessarily been able to compensate for the lack of registration between serially arranged printheads for all image densities in a color separation.

SUMMARY

A method processes image data in a color separation to attenuate printing defects arising from misalignment of serially arranged printheads that eject ink for the color separation. The method includes processing image values of the color separation with a first rendering process that corresponds to one printhead in a plurality of serially arranged printheads for printing the color separation, processing the image values of the color separation with a second rendering process that differs from the first rendering process for at least one other printhead in the plurality of serially arranged printheads for printing the color separation, generating firing signals for the one printhead from the rendered image values generated by the first rendering process, and generating firing signals for the at least one other printhead from the rendered image values generated by the second rendering process.

The method may be performed by a system that renders image data for an color separation. The system includes an image receiver that receives a color separation from an image source, at least two printheads that are serially arranged to print the color separation, and a processor that is configured to render input image values of the color separation in accordance with a first rendering process and to render input image values of the color separation in accordance with a second rendering process.

BRIEF DESCRIPTION OF THE DRAWINGS

The foregoing aspects and other features of a printer that enables input image values of a color separation to be processed differently for different serially arranged printheads are explained in the following description, taken in connection with the accompanying drawings, wherein.

DETAILED DESCRIPTION

Figure 1:
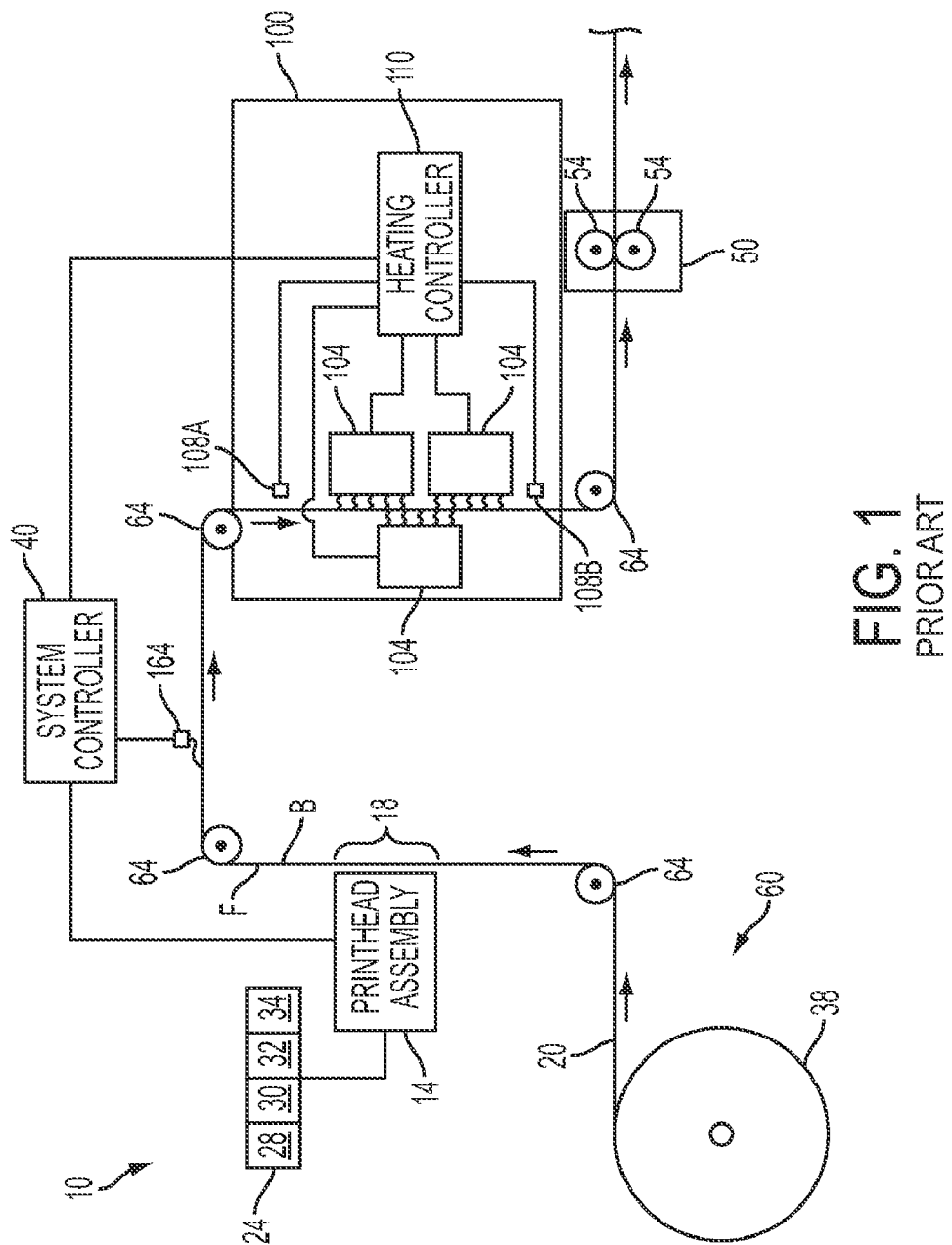
FIG. 1 is a block diagram of an inkjet printing system in which a system and method that process input image values for a color separation to be printed by serially arranged printheads may be used.

For a general understanding of the environment for the system and method disclosed herein as well as the details for the system and method, reference is made to the drawings. In the drawings, like reference numerals have been used throughout to designate like elements. As used herein, the word "printer" encompasses any apparatus that performs a print outputting function for any purpose, such as a digital copier, bookmaking machine, facsimile machine, a multi-function machine, etc.

FIG. 1 depicts an imaging apparatus, or at least a portion of an imaging apparatus, 10 in which elements pertinent to the present disclosure are shown. In the embodiment shown, the imaging apparatus 10 implements a solid ink print process for printing onto a continuous media web. To this end, the imaging device 10 includes a web supply and handling system 60, a phase change ink printing system 16, and a web heating system 100. Although the image data processing system and method are described below with reference to the imaging system depicted in FIG. 1, the color separation processing system and method may be used in any imaging apparatus, such as a cartridge inkjet system, that uses serially arranged printheads to eject ink onto an image substrate.

As shown in FIG. 1, the phase change ink printing system includes a web supply and handling system 60, a printhead assembly 14, a web heating system 100, and a fixing assembly 50. The web supply and handling system 60 may include one or more media supply rolls 38 for supplying a media web 20 to the imaging device. The supply and handling system is configured to feed the media web in a known manner along a media pathway in the imaging device through the print zone 18, past the web heating system 100, and through the fixing assembly 50. To this end, the supply and handling system 60 may include any suitable device 64, such as drive rollers, idler rollers, tensioning bars, etc., for moving the media web through the imaging device. The system may include a take-up roll (not shown) for receiving the media web 20 after printing operations have been performed. Alternatively, the media web 20 may be fed to a cutting device (not shown) as is known in the art for cutting the media web into discrete sheets.

The printhead assembly 14 is appropriately supported to eject drops of ink directly onto the media web 20 as the web moves through the print zone 18. In other imaging systems in which the color separation processing system and method may be used, the printhead assembly 14 may be configured to eject drops onto an intermediate transfer member (not shown), such as a drum or belt, for subsequent transfer to a media web or media sheets. The printhead assembly 14 may have two or more printheads. Within each printhead, a plurality of inkjets is arranged in a row and column fashion. Each of the inkjets is coupled to a source of liquid ink and each one ejects ink through an inkjet nozzle in response to a firing signal being received by an inkjet actuator, such as a piezoelectric actuator, in the inkjet.

In the illustrated system of FIG. 1, the printhead assembly includes a plurality of printheads for printing full color images comprised of the colors cyan, magenta, yellow, and black. For example, the printhead assembly 14 in FIG. 1 may have eight printheads, two for each color of ink supplied by the solid ink supply 24. Each printhead has a predetermined inkjet density, which may be, for example, 300 dots per inch (dpi). The two or more printheads for a particular color are serially arranged, which means that some of the printheads are located downstream in the direction of web movement from the other printheads that eject the same color of ink. The downstream printheads may be offset from the upstream printheads by an integral number plus zero to one-half of the inkjet spacing on a printhead. Thus, the serially arranged printheads enable one or more rows, depending upon the number of inkjet rows in the printheads, to be printed with a density that is twice the density of each single printhead. For example, two 300 dpi printheads offset by a distance of one-half of an inkjet width enable rows of 600 dpi to be printed, though the printheads need not be aligned to an integral number plus one-half of the inkjet spacing either by intention or by misalignment.

In the printing system shown in FIG. 1, ink is supplied to the printhead assembly from a solid ink supply 24. In aqueous or emulsion ink systems, which use the color separation processing system and method disclosed herein, however, the liquid ink may be stored in one or more volumetric containers installed in the printing system. Since the phase change ink imaging device 10 is a multicolor device, the ink supply 24 includes four sources 28, 30, 32, 34, representing four different colors CYMK (cyan, yellow, magenta, black) of phase change ink solid ink. The phase change ink system 24 also includes a solid phase change ink melting and control assembly or apparatus (not shown) for melting or phase changing the solid form of the phase change ink into a liquid form, and then supplying the liquid ink to the printhead assembly 14. Each color of ink is supplied to at least a pair of serially arranged printheads. The differently colored inks are supplied through separate conduits. A single line connects the ink supply 24 with the printhead assembly 18 in the figure to simplify the representation depicted in the figure. Operation and control of the various subsystems, components, and functions of the device 10 are performed with the aid of a controller 40.

In order to form an image with the ink ejected by the printhead assembly 14, image data are converted into firing signals that selectively actuate the inkjets in the printheads to eject ink onto the web as it moves past the printhead assembly. Typically, digital image data are received by the device 10. These digital image data may include an image for each color to be printed in the image. The input image data for a single color is called a color separation for the overall image. Each datum in a color separation corresponds to an input image value for a particular location in the color separation. In previously known systems having serially arranged printheads, all of the input image values for a color separation were equally distributed among the inkjets in the serially arranged printheads that correspond to a particular location in an image. For example, an input image value at a particular location in a color separation to be printed by two serially arranged printheads would be processed to generate an output image value for each printhead having an inkjet corresponding to that location in one of the serially arranged printheads. The output image values are then provided to a printhead controller that generates firing signals for each inkjet in each printhead that ejects ink for a color separation. The processing of the input image values in the color separations is typically performed by a marking engine, which is controlled by a processor executing instructions stored in a memory operatively coupled to the processor.

The processor for the marking engine may be one or more processors configured to perform the color separation processing described below. The processor may be a general purpose processor having an associated memory in which programmed instructions are stored. Execution of the programmed instructions enables the processor to process each ink density in a color separation differently for each printhead associated with a particular color. The processor may, alternatively, be an application specific integrated circuit or a group of electronic components configured on a printed circuit for operation of the independent processing of the ink densities for the two serially arranged printheads. Thus, the processor may be implemented in hardware alone, software alone, or a combination of hardware and software. In one embodiment, the processor for the marking engine that independently renders each portion of a color separation comprises a self-contained, microcomputer having a central processor unit (not shown) and electronic storage (not shown). The electronic storage may be a non-volatile memory, such as a read only memory (ROM) or a programmable non-volatile memory, such as an EEPROM or flash memory. The image data source may be any one of a number of different sources, such as a scanner, a digital copier, a facsimile device, etc.

Once the input image values have been used by the printhead controller to generate firing signals for the inkjets in the serially arranged printheads, drops of ink are ejected by the printhead assembly onto the moving web to form an image. The web continues to move so the image passes through a fixing assembly 50, which fixes the ink drops to the web. In the embodiment of FIG. 1, the fixing assembly 50 comprises at least one pair of fixing rollers 54 that are positioned in relation to each other to form a nip through which the media web is fed. The ink drops on the media web are pressed into the web and spread out on the web by the pressure formed by the nip. Although the fixing assembly 50 is depicted as a pair of fixing rollers, the fixing assembly may be any suitable type of device or apparatus, as is known in the art, which is capable of fixing, drying, or curing an ink image onto the media.

Figure 2:
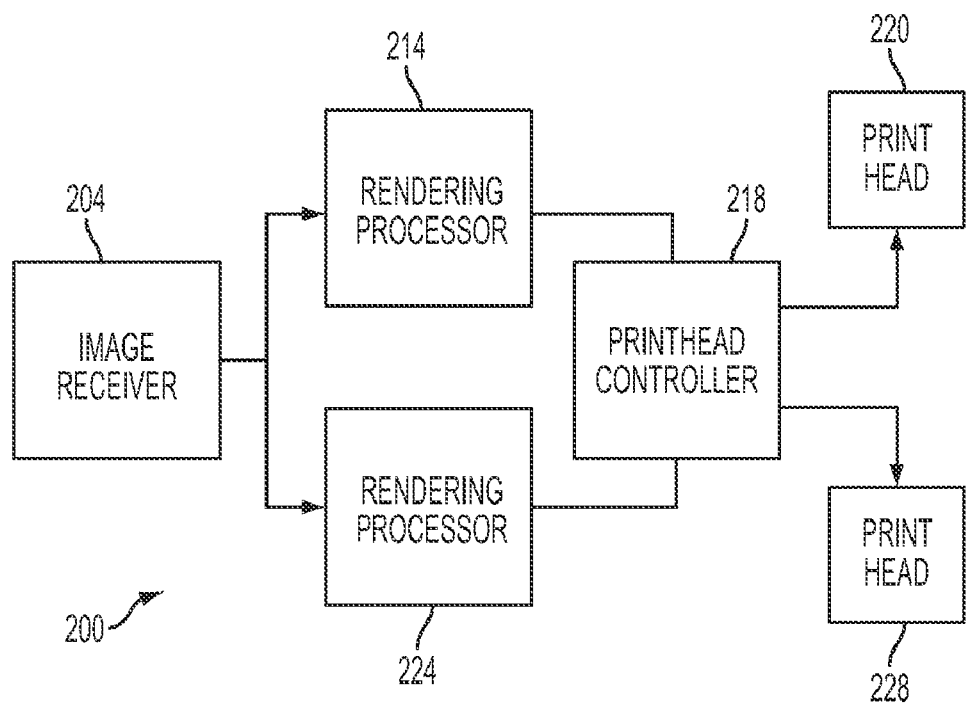
FIG. 2 is a block diagram of a system that processes input image values in a color separation to compensate for a lack of registration between serially arranged printheads.

A block diagram of a system that processes the input image values independently for each printhead in a group of serially arranged printheads is shown in FIG. 2. The system 200 includes an image receiver 204 that receives a color separation from an image source. The input image values of the color separation stored in the receiver 204 are processed by a first processor 214 to generate output image values that are used by printhead controller 218 to generate firing signals for the printhead 220. The input image values of the color separation are also independently processed by a second processor 224 to generate output image values that are used by the printhead controller 218 to generate firing signals for the printhead 228. Because the printheads 220 and 228 are serially arranged, the independent processing of the input image values in the color separation helps compensate for nonalignment between the two printheads.

In the embodiment shown in FIG. 2, the two processors 214, 224 process the input image values of the color separation in parallel to enhance the speed of image processing by the system 10. In another embodiment, a single processor may be used to process the input image values of the color separation in a serial manner and generate multiple sets of output image values, one set for each serially arranged printhead. This embodiment is not as fast as the parallel processing embodiment, but the use of a single processor and its associated circuitry saves some expense over the parallel processing system.

Independently processing the input image values of the color separation for the two or more serially arranged printheads may be performed in a variety of manners. In one embodiment, all of the input image values to be printed by one of the serially arranged printheads are processed with an error diffusion process, while the input image values to be printed by the other serially arranged printhead are rendered with a halftone screening process. In another embodiment, all of the input image values of the color separation to be printed by one of the serially arranged printheads are processed with a stochastic halftone screening process, while all of the input image values of the color separation to be printed by the other serially arranged printhead are processed with a different stochastic halftone screening process. Different halftone screens may have similar characteristics, but be uncorrelated from one another. For example, many stochastic halftones have similar blue noise characteristics or satisfy other constraints, such as avoiding specific local patterns for ink drop generation, without being correlated to one another. Thus, different halftone screens are uncorrelated to one another.

Figure 3:
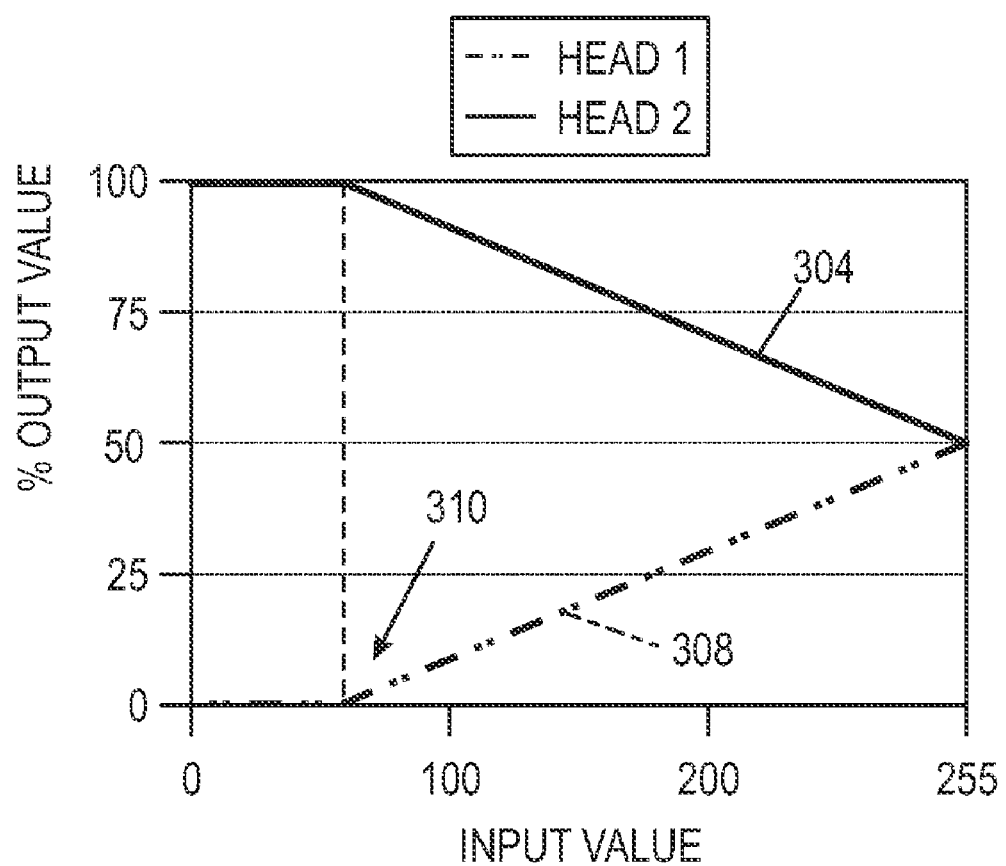
FIG. 3 is a graph of two mapping processes that may be used to map input image values to different output image values for most of the input image values in a color separation.

In other embodiments, different mapping curves may be used to distribute the input image values of a color separation independently. For example, FIG. 3 shows a mapping function 308 for the first printhead and a mapping function 304 for the second printhead. Each mapping function maps an input image value to an output image value as a percentage of the input image value. For input image values at or below a first threshold input image value 310, which corresponds to an input image value of 40, the mapping function 304 maps an input image value from the color separation to an output image value that corresponds to 100 percent of the color separation input image value. The mapping function 308 maps all input image values below the first threshold input image value to an output image value that is zero percent of the color separation input image value. Thus, the output image values generated from the mapping function 304 enable the printhead controller to generate firing signals for the corresponding inkjets in the second printhead that eject 100 percent of the ink for the color separation input image values that are at or below the first threshold input image value. Likewise, the output image values generated from the mapping function 308 enable the printhead controller to generate firing signals for the corresponding inkjets in the first printhead that eject zero percent of the ink for the color separation input image values that are at or below the first threshold input image values. For input image values in the color separation that are above the first threshold 310, the mapping function 304 generates an output image value that lies on the line of the mapping function 304 between 100 percent and 50 percent of a total output image value. Similarly, the mapping function 308, for input image values above the first threshold 310, generates an output image value that lies on the line of the mapping function 308 between zero percent and 50 percent of the input image value. Consequently, 100 percent of each input image value in the color separation is printed by the serially arranged printheads, however, the input image value is disproportionately distributed between the two printheads, except for the maximum image density.

The two mapping functions depicted in FIG. 3 are useful for printing color separations in which smaller input image values printed by a plurality of serially arranged printheads make a lack of alignment more noticeable. Because the smaller input image values are printed by only one printhead, the lack of alignment between the two printheads is not detectable. The threshold value is a selected value above which the misalignment is less noticeable as the amount of ink ejected by the printheads increases. In the example of FIG. 3, this value corresponds to approximately 15% of the maximum input image value. This value may be established empirically and may vary between ink colors and types of printers. Additionally, the output value generated for input image values below the threshold may vary. For example, in one embodiment, the output values generated by the first mapping function for input image values below the threshold may be in the range of approximately 75% to 100% of the total output image value, while the output values generated by the second mapping function for the same input image values may be in the range of 0% to approximately 25% of the total output image value. In these embodiments, the two mapping functions again merge towards a 50/50 distribution of the image input value at the maximum input image value. The terms "first" and "second" as used herein do not necessarily refer to the first printhead or second printhead encountered in the print process direction. The mappings or renderings for the various serially arranged printheads may be performed in any order regardless of physical arrangement of the printheads and, may even be intermixed with rendering or mappings done for other printheads in other serially arranged printheads.

In some image producing systems, more than two printheads are serially arranged to print a color separation. In such systems, an independent rendering or mapping process may be used to generate the output image values used to generate firing signals for a particular printhead. Thus, in a system in which N printheads are serially arranged to print a color separation (where N=3 or more), N mapping functions may be used. In the range of input image values below the threshold, the output image values are unequally distributed by the mapping functions. At least one of the mapping functions maps input image values below the threshold to a range of output image values that corresponds to (150%/N) to 100% of the total for the output image values generated for all of the serially arranged printheads for any given input image value. Thus, for at least one of the printheads, the output image value range for input image values below a threshold in a system having four serially arranged printheads for a color separation is between approximately 38% to 100% of the total of the output image values.

In another embodiment, the values generated by the mapping for the first serially arranged printhead may be processed with a stochastic screening process in which errors from the quantization process are distributed. Likewise, the values generated by the mapping for the second serially arranged printhead may be processed by a second stochastic screening process in which the quantization errors are also distributed. Even if the two stochastic screening processes are performed within one processor the process is the equivalent of two independent processes being performed as long as the quantization errors for the first serially arranged printhead are not distributed to the output values for the second serially arranged printhead and vice versa. The most common error distributing screening process is error diffusion. In one embodiment, independent error diffusion processes are used to distribute the quantization errors for each serially arranged printhead.

In another embodiment, the input image values are filtered and processed to detect discernable variations, such as lines and edges, for input image values in a color separation that are to be printed by multiple serially arranged printheads. For these discernable variations, alternative mapping functions may be used. For example, thin lines and object edges may be better treated by applying mapping functions that more evenly distribute the input image values across the printheads. Such treatment may avoid variations in lines or edges that appear predominately in one of the printheads. Thus, mapping functions that disproportionately distribute the input image values across the serially arranged printheads may be used in the interior of an object, while different mapping functions that more evenly distribute the input image values may be used at the edge of the object.

The non-alignment of the two or more printheads that eject ink of a particular color is particularly noticeable when the input image values of a fairly uniform area in a color separation are correlated by the same rendering process. This effect is especially noticeable in highlights, but may also be discernible in shadows, that are generated by processes that distribute all of the input image values, regardless of value, equally across the printheads with a distribution that results in the ejected ink drops being approximately equally spaced. As known in the art, the ejected ink drops are only approximately equally spaced as they are subject to the physical properties of the printing components and to the differing image values and image content. Rather than equally distributing the input image values of the color separation across the printheads ejecting the ink for the color separation, the method and system disclosed herein unequally distributes the input image values of the color separation across the printheads used to print the color separation. The mapping function for each printhead distributes the output values for each printhead so the output image values for each printhead are approximately equally spaced from one another. The approximately equal spacing is achieved using statistical spacing processes, which are well known in the art of image rendering methods, such as designing stochastic halftone screens and error diffused screens. The distributions of the ink drops ejected by the serially arranged printheads, however, may vary in spacing and are not equally spaced in a statistical manner. Thus, misalignment of printheads within the serially arranged printheads with respect to one another impacts the resulting image quality less noticeably.

Regardless whether one or two processors are used for rendering a color separation, the input image values for a color separation are treated differently. Of course, rendering processes and combinations of rendering processes other than the ones disclosed above may be used to render the input image values of a color separation for multiple serially arranged printheads. As used herein, independent rendering refers to the outcome of the process giving different and asymmetrically distributed output values that are provided to each printhead in a plurality of serially arranged printheads. References to multiple mappings herein does not necessarily refer to a separate halftone screening or manipulation process for each of the specified "maps", but merely to the fact that the ink ejected from different serially arranged printheads does not follow the symmetric or conventional halftone screening patterns one expects with an image produced by a single printhead.

Figure 4:
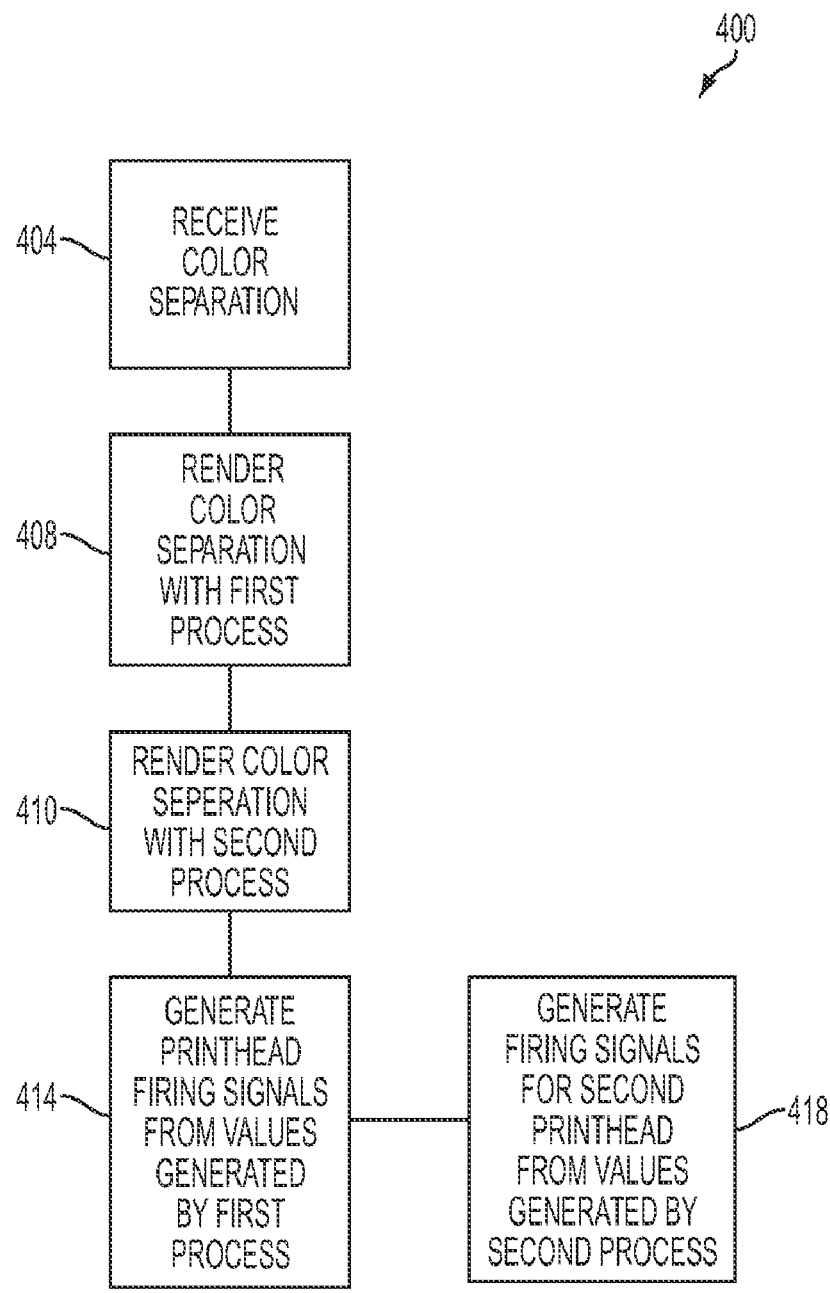
FIG. 4 is a flow diagram of a method that processes input image values in a color separation differently to compensate for a lack of registration between serially arranged printheads.

A method for independently rendering portions of a color separation is shown in FIG. 4. The method 400 includes receipt of a color separation from an image source (block 404). The input image values of the color separation are rendered using a first rendering method that corresponds to one of the serially arranged printheads (block 408) and the input image values of the color separation are rendered using a second rendering method that corresponds to the other serially arranged printhead (block 410). The first rendering generates output image values that are used to generate firing signals for the first printhead (block 414) and the second rendering generates output image values that are used to generate firing signals for the second printhead (block 418). Also, as previously noted, the rendering processes may be performed in parallel.

It will be appreciated that various of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method for processing image data for a color separation comprising:
processing image values of the color separation with a first rendering process that corresponds to one printhead in a plurality of serially arranged printheads for printing the color separation, the first rendering process being one of a first error diffusion process, a first stochastic halftone screening process, and a first mapping process;

processing the image values of the color separation with a second rendering process that differs from the first rendering process for at least one other printhead in the plurality of serially arranged printheads for printing the color separation, the second rendering process being one of a second error diffusion process, a halftone screening process, a second stochastic halftone screening process that is different than the first stochastic halftone screening process, and a second mapping process that is different than the first mapping process;

generating firing signals for the one printhead from the rendered image values generated by the first rendering process; and generating firing signals for the at least one other printhead from the rendered image values generated by the second rendering process.

2. The method of claim 1 wherein the first mapping process maps input image values of the color separation having a value below a predetermined image value to an output image value that is greater than an output image value to which the second mapping process maps input image values.

3. The method of claim 2 wherein the predetermined image value is less than fifteen percent of a maximum input image value and the first mapping process maps input image values below the predetermined image value to output image values in a range from approximately 150 percent of a total output image value divided by a total number of printheads in the plurality of printheads to 100 percent of the total output image value.

4. The method of 1 further comprising:
   detecting an edge in the input image values of the color separation; and
   replacing at least one of the first and the second mapping processes with a mapping process that distributes the input image values in the detected edge approximately equally between the serially arranged printheads.

5. The method of claim 1 wherein the first rendering process and the second rendering process are performed in parallel.

6. A system for rendering image data for an image to be generated by a printer comprising:
   an image receiver that receives a color separation from an image source;
   at least two printheads that are serially arranged to print the color separation;
   a processor that is configured to render input image values of the color separation in accordance with a first rendering process, which is one of a first error diffusion process, a first stochastic halftone screening process, and a first mapping process, and to render input image values of the color separation in accordance with a second rendering process, the second rendering process being one of a second error diffusion process, a halftone screening process, a second stochastic halftone screening process that is different than the first stochastic halftone screening process, and a second mapping process that is different than the first mapping process; and
   a printhead controller that generates firing signals for one of the at least two printheads from the rendered image values generated by the first rendering process and that generates firing signals for the at least one other printhead in the at least two other printheads from the rendered image values generated by the second rendering process.

7. A method for distributing output image values over a plurality of serially arranged printheads, which print a color separation, comprising:
   processing input image values of a color separation to generate a first set of output image values for one printhead in a plurality of serially arranged printheads for printing the color separation, and to generate a second set of output image values for at least one other printhead in the plurality of serially arranged printheads for printing the color separation, the first set of output image values having a larger number of output image values that correspond to input image values below a threshold value than the second set of output image values with the output image values in the first set of output image values that correspond to input image values below the threshold being larger values than the output image values in the second set of output image values that correspond to input image values below the threshold and the output image values in the first set of output image values being values within a first predetermined range of output image values;
   generating firing signals from the first set of output image values for the one printhead in the plurality of serially arranged printheads; and
   generating firing signals from the second set of output image values for the at least one other printhead in the plurality of serially arranged printheads.

8. The method of claim 7 wherein the output image values in the first set of output image values are statistically uniformly distributed.

9. The method of claim 8 wherein the output image values in the second set of output image values are statistically uniformly distributed.

10. The method of claim 7 wherein the output image values in the second set of output image values are values within a second predetermined range of output image values, all of the values in the first predetermined range of values being greater than all of the values in the second predetermined range of values.

11. The method of claim 10 wherein the plurality of printheads has a number N of serially arranged printheads, and the values in the first predetermined range are between 150 percent divided by N to 100 percent of a total output image value below the threshold value.

12. The method of claim 7 wherein the first set of output image values has a number of output image values corresponding to input image values equal to or greater than the threshold that is approximately equal to a number of output image values in the second set that correspond to input image values equal to or greater than the threshold.

13. The method of claim 12 wherein a sum of an output image value in the first set of output image values that was generated for an input image value and an output image value in the second set of output image values that was generated for the input image value is equal to the input image value.

* * * * *